United States Patent
Aguilar et al.

(10) Patent No.: US 7,232,219 B2
(45) Date of Patent: Jun. 19, 2007

(54) VIEWING APPARATUS FOR SIMULATING IMPAIRMENT

(75) Inventors: Michael J. Aguilar, Verona, WI (US); Patrick J. Flaherty, Bettendorf, IA (US)

(73) Assignee: Innocorp, Ltd., Verona, WI (US)

( * ) Notice: Subject to any disclaimer, the term of this patent is extended or adjusted under 35 U.S.C. 154(b) by 0 days.

(21) Appl. No.: 10/889,743

(22) Filed: Jul. 13, 2004

(65) Prior Publication Data

US 2005/0036110 A1 Feb. 17, 2005

Related U.S. Application Data

(60) Provisional application No. 60/487,917, filed on Jul. 17, 2003.

(51) Int. Cl.
*G02C 7/02* (2006.01)

(52) U.S. Cl. .................. 351/175; 351/240; 351/46; 351/172

(58) Field of Classification Search ............... 351/175
See application file for complete search history.

(56) References Cited

U.S. PATENT DOCUMENTS

| | | | |
|---|---|---|---|
| 3,628,854 A | 12/1971 | Jampolsky | 351/175 |
| 3,705,760 A | 12/1972 | Langendorfer et al. | 351/44 |
| 3,904,281 A | 9/1975 | Jampolsky | 351/159 |
| 4,012,116 A * | 3/1977 | Yevick | 359/465 |
| 4,698,564 A | 10/1987 | Slavin | 318/257 |
| 4,960,326 A * | 10/1990 | Dauvergne | 351/41 |
| 5,323,190 A * | 6/1994 | Onufryk | 351/158 |
| 5,350,304 A | 9/1994 | Fula et al. | 434/258 |
| 5,362,238 A | 11/1994 | Slavin | 434/65 |
| 5,495,305 A | 2/1996 | Martin et al. | 351/177 |
| 5,737,056 A | 4/1998 | Martin et al. | 351/177 |
| 5,867,247 A | 2/1999 | Martin et al. | 351/177 |
| 6,206,521 B1 | 3/2001 | Kindschuh | 351/175 |
| 6,359,736 B1 * | 3/2002 | Yoshimura | 359/619 |

OTHER PUBLICATIONS

Pacific Science Center, "Altering reality goggles," (1997).
Innocorp Ltd., "The straight line: a sobering view of what impairment can do," Fatal Vision 1:1-4 (1997).
Innocorp, Ltd., "Impairment! What are the Risks?", Fall 2005 Catalog.

* cited by examiner

*Primary Examiner*—Jordan Schwartz
*Assistant Examiner*—Jessica Stultz
(74) *Attorney, Agent, or Firm*—Quarles & Brady LLP

(57) ABSTRACT

The present invention provides a viewing apparatus for simulating visual impairment. In one embodiment, the apparatus includes a frame defining a viewing area and first and second lenses supported by the frame. The first lens is disposed in a first region of the viewing area. The second lens is disposed in at least a second region of the viewing area. The first and second lenses have different image distortion patterns. In another embodiment, the apparatus may include frame and a lens supported by the frame. The lens includes a first plurality of image distorting features disposed in a first region of the lens; and a second plurality of image distorting features defined in the first region of the lens.

17 Claims, 3 Drawing Sheets

VIEWING APPARATUS FOR SIMULATING IMPAIRMENT

CROSS-REFERENCE TO RELATED APPLICATIONS

This claims the benefit of U.S. Provisional Patent Application No. 60/487,917 filed on Jul. 17, 2003.

STATEMENT REGARDING FEDERALLY SPONSORED RESEARCH OR DEVELOPMENT

Not applicable

BACKGROUND OF THE INVENTION

The present invention relates to a viewing apparatus that simulates the impairing effect of an intoxicant by impairing a wearer's visual faculties.

Substantial effort is undertaken by educators, law enforcement personnel, safety promoting organizations, and the like to convince people, particularly young people, of the hazards associated with the state of being under the influence of intoxicants such as alcohol, legal, and illegal drugs. Impairment has particular ramifications while operating a motor vehicle. It is particularly challenging to provide a meaningful firsthand experience of the impairing effects of an intoxicant, in so far as one typically cannot induce impairment in a subject with the intoxicant and, even if one could, it would be improper to then ask the subject to operate a motor vehicle while impaired.

It is therefore desirable to provide an apparatus for simulating the effects of impairment on a subject under the influence of an intoxicant. One such apparatus is disclosed in U.S. Pat. No. 6,206,521 and includes a conventional goggle employing a fresnel lens that is said to distort the image to the user. However, the '521 patent does not provide various goggles to simulate corresponding varying degrees of impairment.

What is therefore desirable is to provide a viewing apparatus for simulating the effects of impairment on a subject under the influence of an intoxicant, where the apparatus can readily be employed in a controlled setting so as to not put the subject at risk, while at the same time effectively conveying varying degrees of impairment associated with intoxication or other sources of impairment including prescription drugs or drowsiness.

SUMMARY OF THE INVENTION

In accordance with one aspect, the present invention provides an apparatus for simulating visual impairment including first and second lenses supported by a frame. The first lens is disposed in a first region of the viewing area, and the second lens is disposed in at least a second region of the viewing area. The first and second lenses have different image distortion patterns.

Another aspect of the present invention is seen in an apparatus for simulating visual impairment including a frame and a lens supported by the frame. The lens includes a first plurality of image distorting features disposed in a first region of the lens; and a second plurality of image distorting features defined in the first region of the lens.

These and other aspects of the invention will be apparent from the description that follows. In the description reference is made to the accompanying drawings which form a part hereof and in which there is shown by way of illustration, and not limitation, embodiments of the invention. Such embodiments do not necessarily represent the full scope of the invention. Reference should therefore be made to the claims herein for interpreting the scope of the invention.

DESCRIPTION OF THE PREFERRED EMBODIMENT

Figure 1:
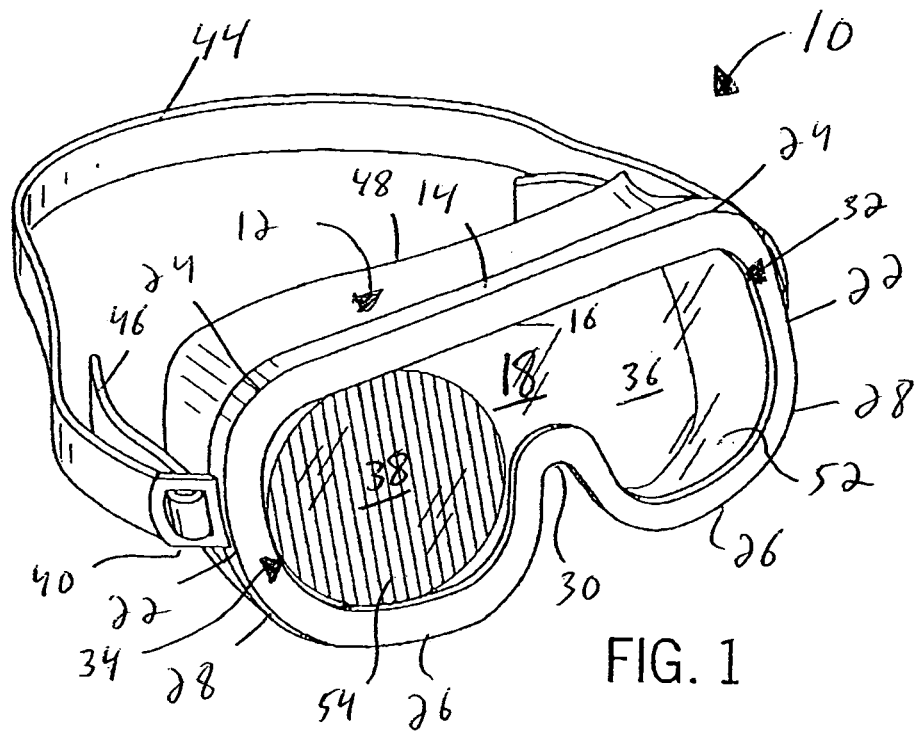
FIG. 1 is a perspective view of a viewing apparatus including a lenticular lens constructed in accordance with one embodiment of the present invention.

Referring now to FIG. 1, an image-shifting distorting goggle 10 includes an outer frame 12 made of any suitable rubber, plastic, or composite material, and is typically translucent and at least partially transparent. The frame 12 includes an outer rim 14 having an upper longitudinally extending portion 16. Opposing curved transverse outer portions 22 depend generally downwardly from the opposing longitudinal outer ends 24 of upper longitudinal portion 16. A corresponding pair of curved lower portions 26 extends generally longitudinally inwardly from the lower ends 28 of transverse outer portion 22. Lower portions 26 are integrally joined at their inner ends by a section 30 that conforms to a user's nose.

The rim 14 defines an interior frame opening 18 that is bound by transverse outer portions 22, upper and lower longitudinal portions 16 and 26, and nose portion 30. Nose portion 30 separates left and right (from the user's standpoint) lens-receiving openings 32 and 34 within frame opening 18. Openings 32 and 34 are generally circular and are configured to receive corresponding left and right lens assemblies 36 and 38, respectively, either or both of which may be image-shifting or distorting. Left and right lens assemblies 36 and 38 are defined by locations within opening 18 that are aligned with the line-of-sight of a user's left and right eye, respectively. The lens assemblies 36 and 38 may have different image distortion patterns. For example, one lens assembly 36, 38 may have a lenticular lens or a fresnel lens. The other lens assembly 36, 38, may have a lens with the same type of image distorting features (e.g., two lenticular lenses with different feature densities) or a different type (e.g., one lenticular lens and one fresnel lens). In some embodiments, the image distortion pattern may include a lens having a distortion pattern defined by a lack of image distorting features, essentially a clear, flat lens. Such a pattern may be useful for simulating impairment in one eye.

A pair of flanges 40 (one shown) extends generally longitudinally outwardly from transverse outer portions 22 and receive the outer ends 46 of a flexible strap 44 that is sized to wrap around the head of a user so as to affix the goggle 10 to the user's face. Strap 44 is adjustable at either or both flanges 40 by either increasing or decreasing the length of the outer ends 46 of the strap 44 to decrease or increase, respectively, the active length of the strap 44. A molding 48 extends inwardly (towards a user's face) from outer frame 12 and generally follows the contour of the outer frame. Molding 48 is compliant so as provide a seal against the user's face. Goggle 10 thus conforms to most any user's face such that one size generally fits all.

Figure 2:
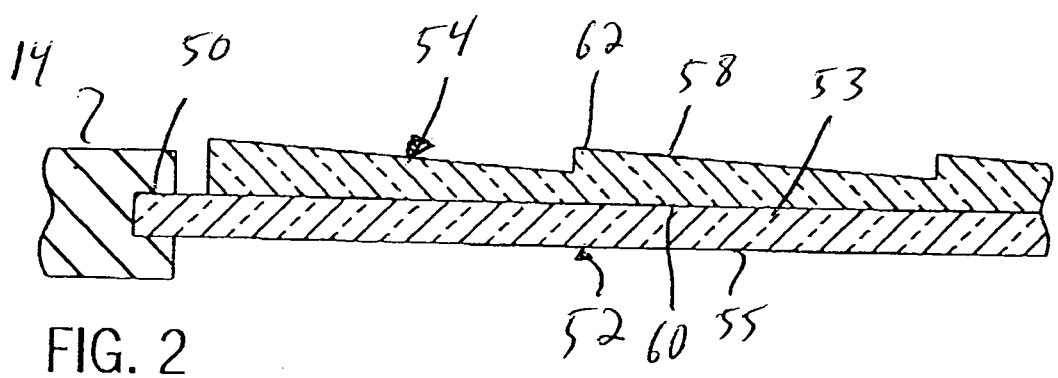
FIG. 2 is an exploded sectional side elevation view of a portion of the viewing apparatus illustrated in FIG. 1.

Referring now also to FIG. 2, rim 14 defines a centrally disposed slot 50 extending along the entire length of the rim that receives therein the outer edges of a transparent supporting lens 52. Lens 52 spans the entire frame opening 18 such that its outer edge fits into slot 50. Locking tabs (not shown) can be formed in slot 50 that mate with corresponding recesses (not shown) in lens 52 to ensure that the lens is properly oriented. Lens 52 is generally formed from transparent plastic, and has a flat inner and outer surface 53 and 55, respectively, so as to provide a clear, undistorted view for the user in accordance with one embodiment. Lens 52 can, however, include any of the image-distorting surfaces described below, if desired, as will become more apparent from the description below. In accordance with the illustrated embodiment, lens 52 provides structural support for lens assemblies 36 and 38.

As illustrated in FIG. 1, a lenticular lens 54 is supported by frame 12 at the right lens assembly 38, such that the lens 54 is disposed in front of the user's right eye. In particular, the outer surface 60 of lens 54 may be adhesively mounted to the inner surface 53 of supporting lens 52 at the right lens assembly 38. A second lenticular lens 54 may also be mounted onto the left lens assembly 36. Alternatively, lenticular lens 54 can be connected to the entire supporting lens 52 and include a plurality of closely spaced image-distorting protrusions 62 located at either or both lens assemblies 36 and 38. Alternatively still, lenticular lens 54 can be of the size and shape of support lens 52 and installed in goggle via slot 50. Alternatively still, supporting lens 52 can provide an integral lenticular lens at either or both lens assemblies 36 and 38, if desired. The present invention thus provides a goggle 10 having an image-shifting distorting lens over only one of (or both of) the user's eyes. It has been found that the goggle 10 illustrated in FIG. 1 provides a level of distortion that simulates the effects of impairment, and in particular visual impairment. As described below, by varying the types of image distorting features in different regions of the user's field of view, or by compounding distortion effects using lenses with multiple layer, the impairment effects can be varied to simulate different types of impairment or different levels of impairment.

Figure 3:
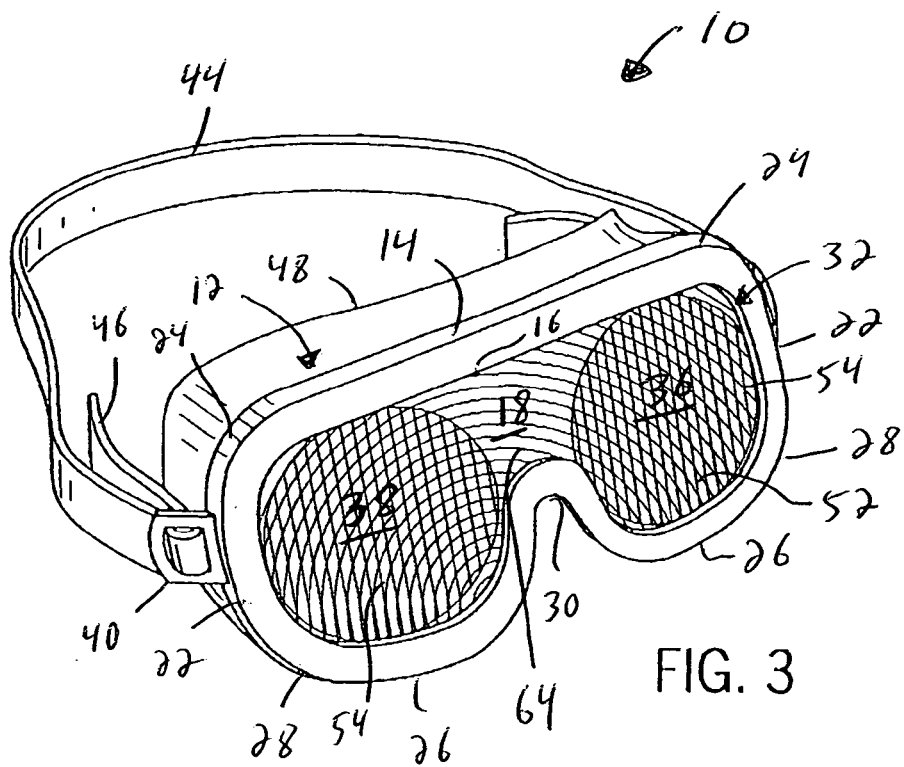
FIG. 3 is a perspective view of a viewing apparatus including a lenticular lens and a fresnel lens constructed in accordance with an alternate embodiment of the present invention.
Figure 4:
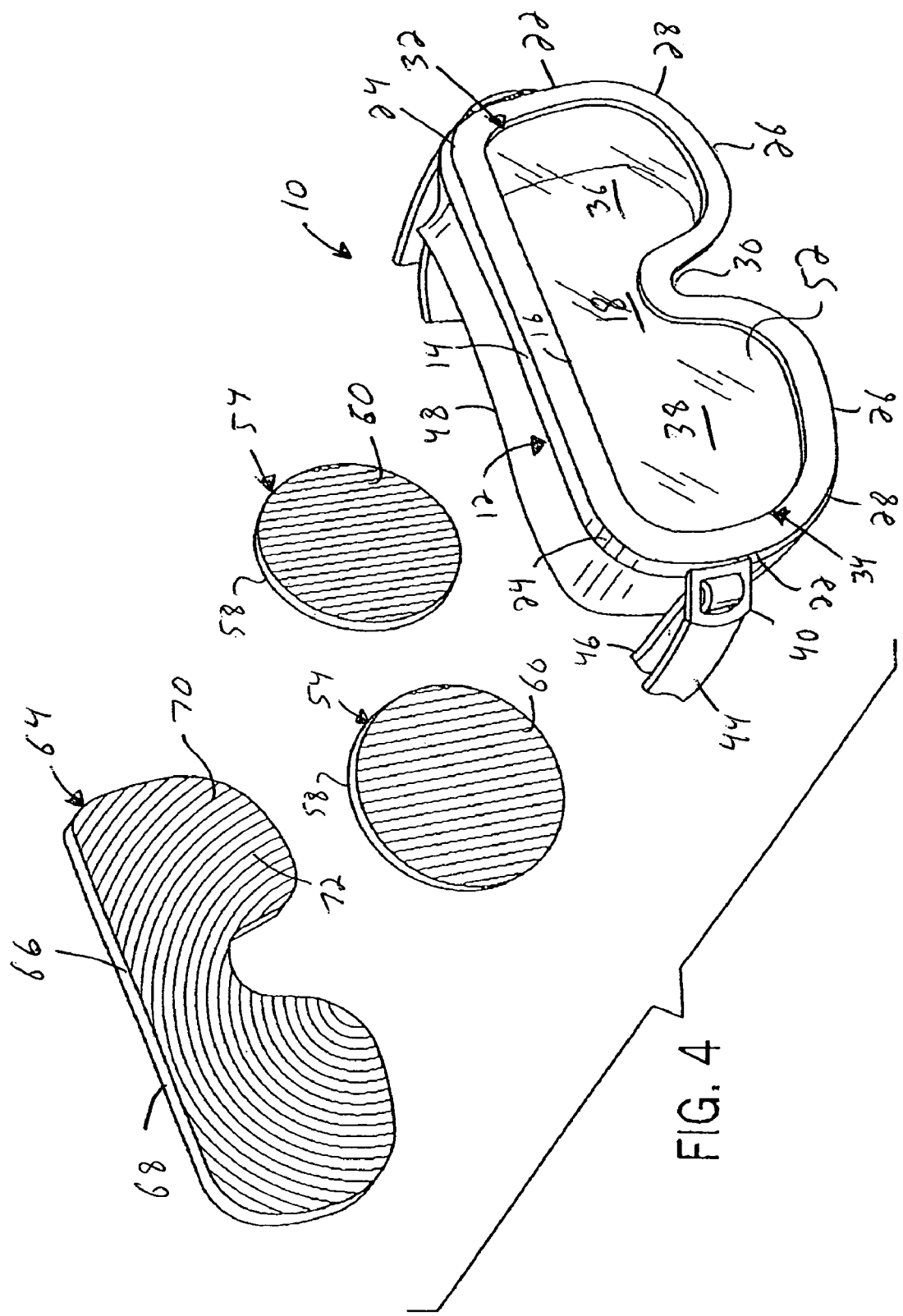
FIG. 4 is an assembly view of the viewing apparatus illustrated in FIG. 3.

Referring now to FIGS. 3 and 4, goggle 10 provides additional image distortion, for example, when simulating an increased level of impairment. Specifically, goggle 10 includes a fresnel lens 64 that spans the entire frame opening 18. The term "fresnel lens" is used throughout this disclosure to define a transparent media 66 defining an inner and outer surface 68 and 70, respectively. A plurality of closely spaced and generally parallel protrusions 72 extends outwardly from at least one of the surfaces 68 and 70. The protrusions 72 are curved, and extend in a direction defined by a circular radius. Alternatively, curved protrusions 72 may extend in any direction without deviating from the fresnel lens 64 as defined by the present invention. In accordance with one embodiment, protrusions 72 are triangular in cross-section, and extend from the inner surface 68 of lens 64. Protrusions 72 are spaced closer together than protrusions 62 of lenticular lens 54. I the illustrated embodiment, lens 64 is made of a flat, plastic transparent sheet, but it can be made of any suitable transparent material suitable for supporting protrusions 72 that distort an image when viewed through the lens 64. Protrusions 72 span between the left and right lens assemblies 36 and 38 so as to be in the line-of-site of both the user's left and right eyes.

Fresnel lens 64 is sized to occupy the entire frame opening 18, and is supported by slot 50. Alternatively, lens 64 can be mounted directly onto lens 52. When used in combination with lenticular lens 54, fresnel lens 64 is mounted such that the outer surface 70 abuts the inner surface 58 of lens 54. Protrusions 72 can alternatively be disposed on outer surface 70 of lens 64, and can be disposed on lens 64 at the left lens assembly 36 or right lens assembly 38. Fresnel lens 64 can alternatively be installed in accordance with any of the methods described above with respect to lenticular lens 54. It has been found that when fresnel protrusions 72 overlap lenticular protrusions 62, the image viewed through the lens is more distorted than viewing the image through fresnel or lenticular protrusions alone. The embodiment illustrated in FIGS. 3–4 simulates the visual effects of increased impairment relative to the embodiment illustrated in FIGS. 1–2. One skilled in the art will appreciate, however, that goggle 10 can include fresnel lens 64 without a lenticular lens 54, or a lenticular lens 54 without a fresnel lens 64.

Figure 5:
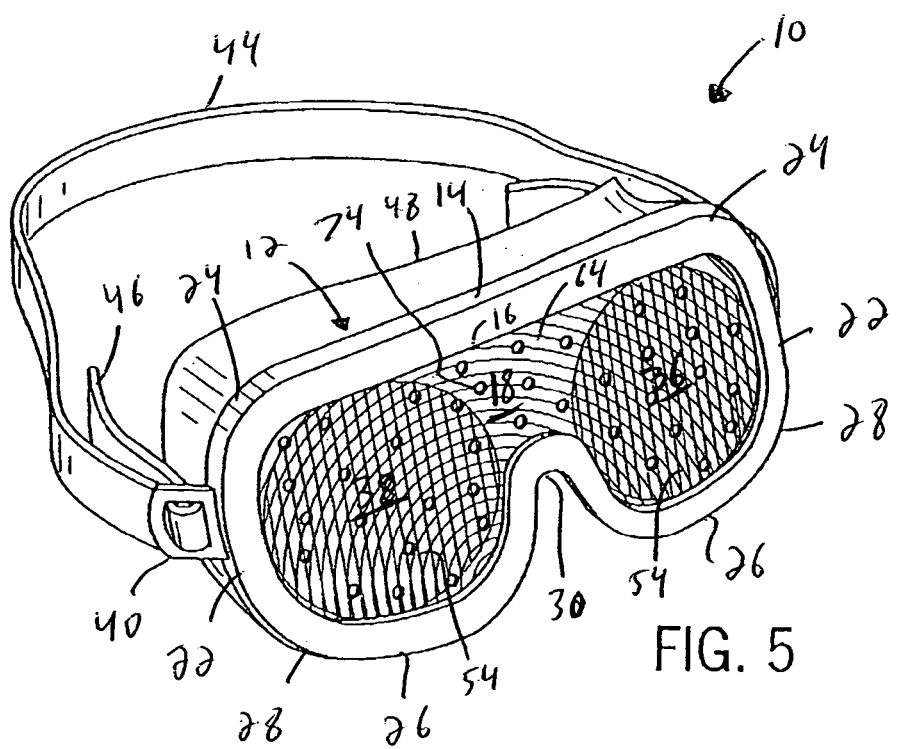
FIG. 5 is a perspective view of a viewing apparatus including a lenticular lens and a fresnel lens defining a plurality of apertures constructed in accordance with an alternate embodiment of the invention.

Referring now to FIG. 5, goggle 10 provides for additional image distortion with respect to the embodiment illustrated in FIGS. 3 and 4. Specifically, a plurality of apertures 74 extend through fresnel lens 64 in any of the configurations described above. Apertures are generally circular in cross section, and extend generally equally across both left and right lens assemblies 36 and 38, respectively. It should be appreciated, however, that apertures 74 may comprise any size and shape suitable for enhancing the simulation of visual impairment provided by goggle 10. An exemplary, but not exhaustive, list of types of apertures 74 includes circles, squares, stars, lines, ovals, slots, slits, moon shapes, shamrocks, squiggly lines, etc). In some embodiments, the apertures 74 may only be partial depth. It should also be appreciated that apertures 74 can be disposed in only one of the lens assemblies. It should further be appreciated that apertures 74 can be more densely populated in one of the lens assemblies with respect to the other lens assembly, or in one portion of one lens assembly (e.g, the top half or right side of one lens assembly). Apertures 74 can alternatively extend through one or more lenticular lenses 54 in any of the configurations described above. In embodiments where the apertures 74 extend through multiple layers of lenses, the apertures 74 in one lens may be aligned or misaligned with respect to a second lens. The presence of apertures 74 has been found to further increase image-distortion, and thus the embodiment illustrated in FIG. 5 simulates the effects of an increased impairment relative to the embodiment illustrated in FIGS. 3–4.

In another embodiment, material may be added to one of the lenses 52, 62 to further increase distortion. For example, rather than forming star shaped apertures 74 through a lens, star shaped protrusions may be formed on the lens in conjunction with the lenticular or fresnel protrusions. Such protrusions may have similar shapes and distributions to those described above for the apertures 74. In general, the apertures or protrusions interrupt the distortion pattern of the fresnel or lenticular protrusions. These interruptions serve to enhance the overall distortion effect.

Advantageously, the lenticular lens 52 and fresnel lens 62 can be easily removed from, and added to, goggle 10. It should be appreciated that any or all of the above-described lenses may be shaded (e.g., using a black or dark colored plastic), and that frame 12 may also be formed from a black or dark colored plastic, when goggle 10 is used to simulate impairment at night or during instances of darkness.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

We claim:

1. A viewing apparatus comprising:
   a frame adapted to be affixed to a face of a user, the frame defining a viewing area;
   a first lens supported by the frame and disposed in a first region of the viewing area, the first lens comprising a first plurality of image distorting features of a first type, the first lens defining a first plurality of apertures; and
   a second lens supported by the frame and disposed in at least a second region of the viewing area, the second lens comprising a second plurality of image distorting features of a second type different than the first type, such that a distorted image is received through at least one region of the viewing area.

2. The apparatus of claim 1, wherein the first lens is disposed in a right lens assembly region, and the second lens is disposed in a left lens assembly region.

3. The apparatus of claim 1, wherein the first plurality of image distorting features includes fresnel protrusions and the second plurality of image distorting features includes lenticular protrusions.

4. The apparatus of claim 1, wherein the second region at least partially overlaps the first region.

5. The apparatus of claim 1, wherein the second region does not overlap the first region.

6. The apparatus of claim 1, wherein the apertures extend though the first lens.

7. The apparatus of claim 1, wherein a second plurality of apertures is defined in the second lens.

8. The apparatus of claim 7, wherein the first plurality of apertures is aligned with the second plurality of apertures.

9. The apparatus of claim 1, wherein the second lens is supported by the first lens.

10. The apparatus of claim 9, wherein the second lens is mounted to the first lens.

11. The apparatus of claim 1, wherein at least one of the frame, first lens, and second lens is shaded.

12. A viewing apparatus for simulating visual impairment, comprising:
    a frame adapted to be affixed to a face of a user; and
    a lens supported by the frame, comprising:
    a first plurality of image distorting features of a first type disposed in a first region of the lens; and
    a second plurality of image distorting features of a second type different than the first type defined in the first region of the lens, such that a distorted image is received through the lens, and wherein the first plurality of image distorting features comprises a plurality of protrusions and the second plurality of image distorting features comprises a plurality of apertures defined in the lens.

13. The apparatus of claim 12, wherein the apertures extend though the lens.

14. The apparatus of claim 12, wherein the apertures have a shape comprising at least one of a circle, a square, a star, a line, an oval, a slot, a slit, a moon, a shamrock, and a squiggly line.

15. The apparatus of claim 12, wherein the first plurality of protrusions comprise at least one of fresnel protrusions and lenticular protrusions.

16. The apparatus of claim 12, wherein the lens has first and second layers, the first plurality of image distorting features being defined in the first layer and the second plurality of image distorting features being defined in the second layer.

17. A viewing apparatus comprising:
    a frame adapted to be affixed to a face of a user, the frame defining a viewing area;
    a first lens supported by the frame and disposed in a first region of the viewing area, the first lens comprising a first plurality of image distorting features of a first type; and
    a second lens supported by the frame and disposed in at least a second region of the viewing area, the second lens comprising a second plurality of image distorting features of a second type different than the first type, such that a distorted image is received through at least one region of the viewing area, and wherein the first plurality of image distorting features includes fresnel protrusions and the second plurality of image distorting features includes lenticular protrusions.

* * * * *